United States Patent [19]

DeLong

[11] Patent Number: 5,098,336
[45] Date of Patent: Mar. 24, 1992

[54] POULTRY PEELING APPARATUS

[76] Inventor: Horace J. DeLong, Rte. 14, Garrison Rd., Box 630, Macon, Ga. 31211

[21] Appl. No.: 599,142

[22] Filed: Oct. 17, 1990

[51] Int. Cl.$^5$ .............................................. A23B 4/03
[52] U.S. Cl. ..................................... 452/130; 452/111
[58] Field of Search ............... 452/111, 112, 125, 130, 452/129

[56] References Cited

U.S. PATENT DOCUMENTS

| | | | |
|---|---|---|---|
| 4,306,333 | 12/1981 | DeLong | 17/11 |
| 4,382,313 | 5/1983 | Harben, Jr. et al. | 452/111 |
| 4,466,158 | 8/1984 | DeLong | 452/111 |
| 4,570,294 | 2/1986 | Meyn | 17/11 |
| 4,570,296 | 2/1986 | Hill et al. | 17/11 |
| 4,723,339 | 2/1988 | van de Nieuwelaar et al. | 17/11 |
| 4,799,292 | 1/1989 | Harben, III | 17/11 |
| 4,856,143 | 8/1989 | Callsen et al. | 452/130 |

FOREIGN PATENT DOCUMENTS 8302207  1/1985  Netherlands ...................... 452/130

Primary Examiner—Bruce M. Kisliuk
Assistant Examiner—Lawrence Cruz
Attorney, Agent, or Firm—Hopkins & Thomas

[57] ABSTRACT

Poultry parts (56), such as poultry breasts, necks and gizzards are placed on a pair of counter rotating peeler rolls (36 and 38). The peeler rolls (36 and 38) each has a series of helical teeth (46) formed along their lengths, which engage the skin (54) of the poultry parts and the visceral matter clinging to the poultry parts (56), peeling it away from the poultry parts (56) as the poultry parts (56) move along the length of the peeler rolls (36 and 38). The counter rotation of the peeler rolls (36 and 38) causes the peeler rolls (36 and 38) to tumble rapidly, enhancing the peeling function.

15 Claims, 3 Drawing Sheets

POULTRY PEELING APPARATUS

FIELD OF THE INVENTION

The present invention generally relates to an improved method and apparatus for removing the skin from parts of poultry carcasses. More particularly, the present invention relates to an improved peeler roll assembly for removing skin, crop, windpipe, lining of gizzards and other matter from parts of poultry carcasses.

BACKGROUND OF THE INVENTION

In the preparation of poultry parts for market, it is a common practice to remove the skin from the poultry parts and to remove the inner lining from gizzards. In the process of removing the skin from poultry parts as well as in the process of removing the inner lining of gizzards, "peeling" or "skinning" machines are used to grasp and pull the skin or lining which employ a pair of elongated peeler or skinning rolls mounted in a side-by-side relationship. The peeler rolls are too close to each other to permit the poultry parts to pass between them and the peeler rolls have a series of helical teeth that mesh together as the peeler rolls rotate and engage and pull the skin from the poultry parts while urging the poultry parts along the lengths of the peeler rolls. The skin, etc. of the poultry part is grasped by the meshing teeth of the peeler rolls and pulled downwardly between the peeler rolls away from the poultry part that remains on the peeler rolls.

However, a problem with conventional peeling machines is that they often fail to completely remove the skin from the poultry parts. As the skin is removed from a poultry part, such as a breast, the peeler rolls of conventional peeling machines tend to tear the skin into small pieces which tend to accumulate between the teeth of the peeler rolls. As a result, the peeler rolls become fouled or "loaded-up" with pieces of skin, making it difficult for the teeth of the peeler rolls to effectively engage and pull additional segments of skin from the poultry part. This problem of the teeth of the peeler rolls becoming loaded-up with skin is especially common with breast skinning machines that utilize peeler rolls having relatively small teeth to avoid pinching and pulling meat away from the breast during the deskinning process. Consequently, the deskinning or peeling of poultry parts such as breasts and gizzards must often be completed by hand or by refeeding the poultry parts into the peeling machine before the poultry parts can be further processed for shipment to market.

Peeler rolls also are used to remove crops, windpipes and other matter extending from the neck of decapitated birds, by moving the birds suspended from their legs over peeler rolls. The peeler rolls grasp and pull the protruding portions of the crops, etc. However, conventional peeling machines generally are not well suited for use in pulling the crops, windpipes and other string like body parts from poultry parts such as poultry necks. The crops and windpipes are typically are tough and sinewy and a relatively strong pulling force is needed to pull the crops and windpipes from the poultry necks. The pairs of peeler rolls used by conventional peeling machines typically cannot generate such a pulling force sufficient to reliably remove the crops, etc. from the necks of the birds. Instead, the peeler rolls tend to pull the crops and windpipes to a certain distance away from the birds into a stretched condition and then continue to apply sliding frictional contact against the crops, etc. until the crops or windpipes wear through and break off, leaving pieces of the crops or windpipes with the poultry necks.

Therefore, it can be seen that it is desireable to provide an improved apparatus for completely and accurately removing the skin, crops, windpipes and other visceral material from poultry parts such as breasts, necks and gizzards without damaging the meat of the poultry parts and without requiring additional peeling and skinning operations to complete the removal of the skin, crops, windpipes or other visceral material from the poultry parts.

SUMMARY OF THE INVENTION

Briefly described, the present invention comprises an improved method and apparatus for removing the skin and visceral matter from parts of poultry carcasses such as breasts, necks and gizzards. Elongated peeler rolls are supported in a support frame in side-by-side, parallel relationship with the upper surfaces of the rolls functioning as poultry part support surfaces and being exposed for engagement by the poultry parts. Each of the peeler rolls has a plurality of helical teeth projecting outwardly from the roll outer cylindrical surface and extending along and winding about the its length of the roll with the teeth of each peeler roll extending opposite to and meshing with the teeth of the other peeler roll to form a "nip". The teeth of each peeler roll are generally relatively small for grasping the skin, etc. and peeling the skin from the poultry breasts and gizzards so as to avoid pinching the meat from the breasts and gizzards. However, for peeling the thicker skin from poultry parts such as poultry necks, somewhat larger teeth are used to engage and pull larger "bites" or segments away from the necks to ensure the complete peeling of the poultry necks.

The two peeler rolls are of different diameters with one peeler roll being substantially larger in diameter than the other peeler roll, with the meshed peeler rolls rotatable in directions counter to each other. As the peeler rolls rotate, the poultry parts resting on the upper surfaces of the peeler rolls tend to tumble and spin on top of the peeler rolls. The skin and other matter loosely connected to or protruding from the more dense muscle of the poultry parts tend to find and become engaged by the teeth of the peeler rolls as the poultry parts tumble. The skin and the visceral matter are gathered by the counter rotational movements of the peeler rolls toward the nip of the meshed teeth of the peeler rolls and pulled downwardly between the peeler rolls and are pulled from the poultry parts as the poultry parts move along the lengths of the peeler rolls.

By utilizing peeler rolls of different diameters, this peeling action is enhanced. The large diameter peeler roll engages the poultry part with greater surface contact than does the small diameter peeler roll. As a result, the larger diameter peeler roll pulls on the poultry part with greater force than does the small diameter peeler roll, causing the poultry parts to spin or tumble at a faster rate than would occur with a pair of peeler rolls of the same size. This increased rate of tumbling increases the rate at which the poultry parts are peeled. Also, if the portion of the poultry part facing the peeler rolls does not have any skin or other matter to be removed, the tumbling motion of the poultry part will turn the poultry part so that the skin of the poultry part will be turned toward the peeler rolls and will be grasped and removed by the peeler rolls.

A second embodiment of the poultry peeling apparatus includes at least three elongated peeler rolls arranged in parallel juxtaposition having a plurality of helical teeth extending along their lengths. The peeler rolls are of different diameters, two small diameter peeler rolls approximately of equal size and a large diameter peeler roll that has its helical teeth meshed with the teeth of the smaller diameter peeler rolls, and all of the peeler rolls are rotatably mounted within a support frame. The peeler rolls are mounted in a side-by-side relationship with the small diameter peeler rolls positioned one above the other and juxtaposed with the large diameter peeler roll such that the teeth of each of the small diameter peeler rolls meshes with the teeth of the large diameter peeler roll as the peeler rolls rotate.

The poultry part is placed upon the peeler rolls and is tumbled by the counter-rotation of the peeler rolls. The skin or other protruding matter clinging to the poultry part is grasped by the teeth of the large diameter peeler roll and the upper small diameter peeler roll and is pulled into the nip between the two peeler rolls and downwardly between the two peeler rolls. The teeth of the two peeler rolls typically are relatively small so as to not pinch and pull meat away from the poultry part. The skin of the poultry part is pulled downwardly between the large diameter peeler roll and the upper small diameter peeler roll by the meshing of the teeth of the two peeler rolls and into the nip between the larger diameter peeler roll and the lower small diameter peeler roll. The skin is then engaged by the meshing of the teeth of the large diameter peeler roll and the lower small diameter peeler roll to thus create a double pulling action. This is effective to grasp and pull longer poultry parts such as crops and windpipes from the necks of decapitated birds.

Flats or gaps are formed in the teeth of the lower small diameter peeler roll at spaced intervals along the length of the peeler rolls by a portion of the teeth of the lower small diameter peeler roll being worn down to approximately half of their height of the other teeth on the lower small diameter peeler roll. As the teeth of the large diameter peeler roll engage these flats, open spaces or cavities are formed within the recesses between the teeth of the large diameter peeler roll. The skin of the poultry part is extruded from between the adjacent full size teeth into these cavities by the pressure of the teeth of the large diameter peeler roll engaging and compressing the skin between the teeth of the large diameter peeler roll and the outer cylindrical surface of the small diameter peeler roll. This compression of the skin extrudes the skin around the teeth of the large diameter peeler roll and into the cavities formed by the half-size teeth where the skin, etc. is accumulated in a mass.

As the skin is extruded into the cavities on the opposite sides of the teeth of the large diameter peeler roll, it is stretched taut until the strain on the skin is sufficient to tear it. The resultant accumulated masses of skin within the cavities are of a sufficient weight such that they will not stick within the recesses between the teeth of the large diameter peeler roll, but instead are urged from between the teeth of the large diameter peeler roll by centrifugal force generated by the rotation of the peeler rolls.

This three peeler roll arrangement of the poultry peeling apparatus also is useful for pulling the crops, windpipes and other string like body parts from the necks of poultry carcasses. The crops, windpipes and other string-like body parts are engaged between the teeth of the large diameter peeler roll and the upper small diameter peeler roll and between the teeth of the large diameter peeler roll and the lower small diameter peeler roll, creating a double pulling action on the crops, etc. This double pulling action pulls the crops, windpipes and other string-like body parts with sufficient force to remove them from the necks of the poultry carcasses.

Thus, it is an object of this invention to provide an improved method and apparatus for removing the skin and other loose matter from the poultry parts.

Another object of this invention is to provide improved peeler rolls for positively gripping and pulling the crops, windpipes and other elongated string-like parts of birds away from the carcass of the birds.

Another object of this invention is to provide an arrangement of peeler rolls having at least one peeler roll of a relatively small diameter and at least one peeler roll of a relatively larger diameter with helical meshing teeth and with at least one peeler roll having flats formed in its teeth at intervals along the length of the peeler roll for the accumulation of additional thicknesses of skin and which tend to sever the skin during the normal rotation of the peeler rolls.

Another object of this invention is to provide an improved method of pulling elongated, string-like body parts, such as crops and windpipes, away from a poultry carcass by engaging the elongated body parts at more than one location along their lengths.

Other objects, features and advantages of the present invention will become apparent upon reading the following specification, when taken in conjunction with the accompanying drawings.

DESCRIPTION OF THE PREFERRED EMBODIMENT

Figure 1:
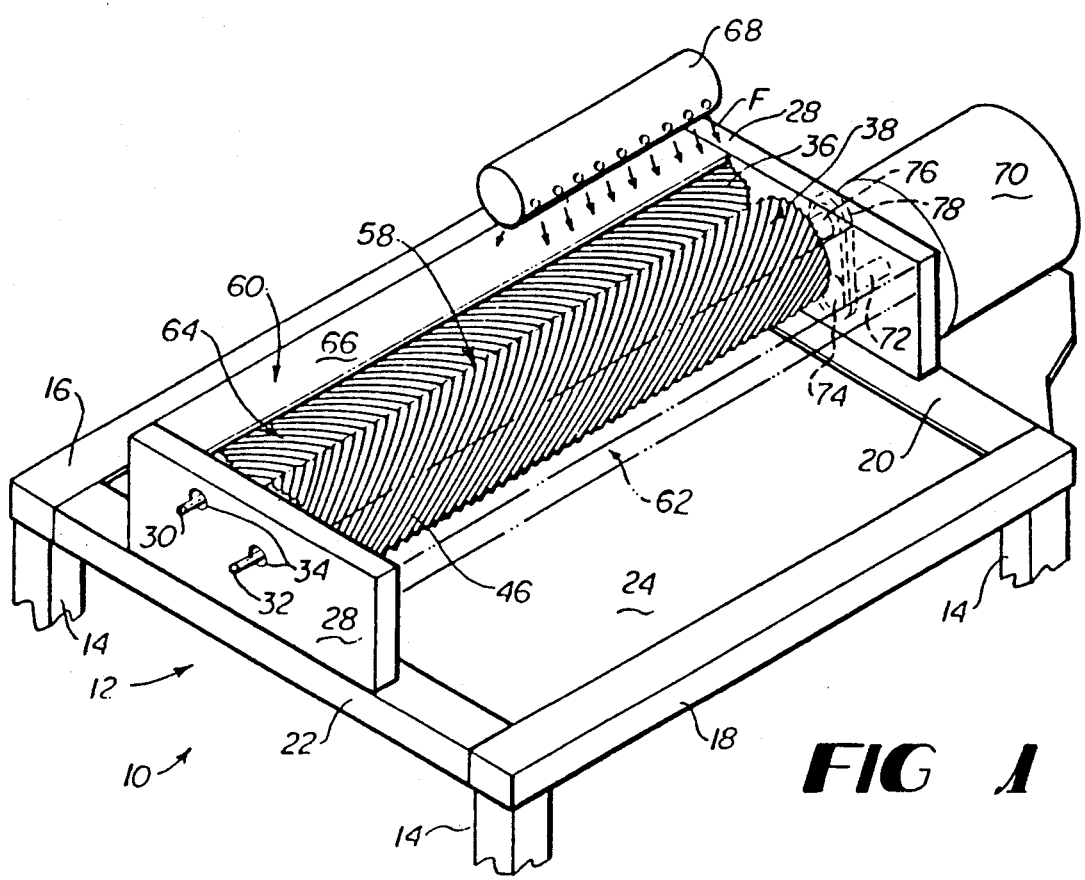
FIG. 1 is a perspective view of the poultry peeling apparatus.

Referring now in greater detail to the drawings in which like numerals indicate parts throughout the several views, FIG. 1 illustrates the poultry peeling apparatus 10 that includes a rectangular support frame 12 having a plurality of vertically disposed legs 14. A pair of side frame members 16 and 18 are mounted to the upper end of the legs 14, and a pair of end frame members 20 and 22 attached to the side frame members 16 and 18 adjacent the legs 14 to thereby form the rectangular support frame 12, having a rectangular open space 24 centrally formed therein and bordered by the side frame members 16 and 18 and the end frame members 20 and 22.

A pair of rectangular cross braces 26 and 28 are mounted on the upper surfaces of end frame members 20 and 22 respectively, extending upwardly and away from the upper surfaces of the end frame members 20 and 22. A pair of axles 30 and 32 are supported by the cross braces 26 and 28, with the axles 30 and 32 extending between the cross braces and with the ends of the axles protruding through openings 34 formed in the cross braces. The axles 30 and 32 support a pair of elongated counter rotating peeler rolls 36 and 38 above the open space 24 bordered by the side frame members 16 and 18 and the end frame members 20 and 22.

Figure 2:
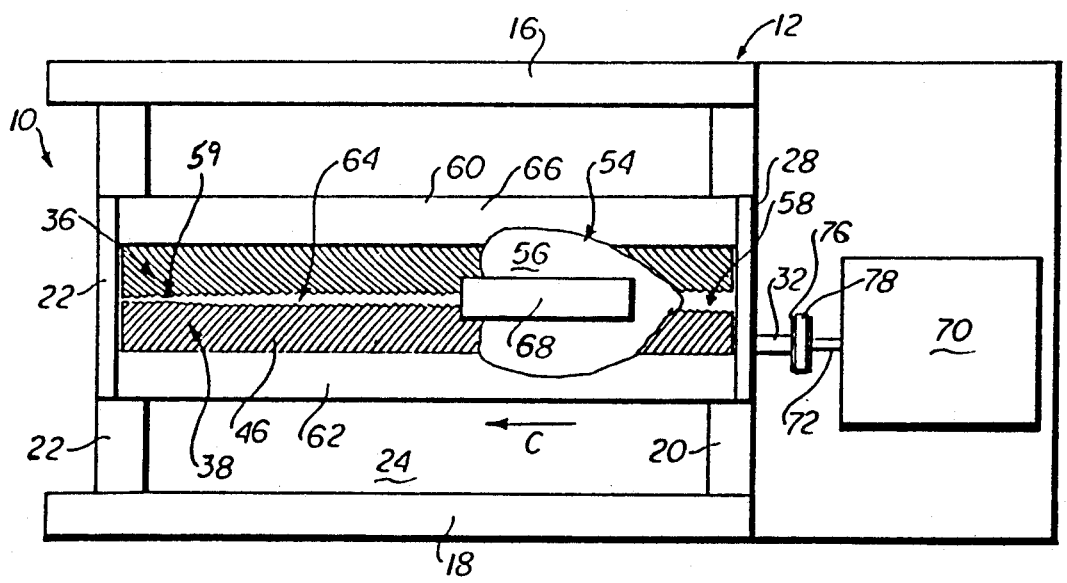
FIG. 2 is a plan view of the poultry peeling apparatus.
Figure 3:
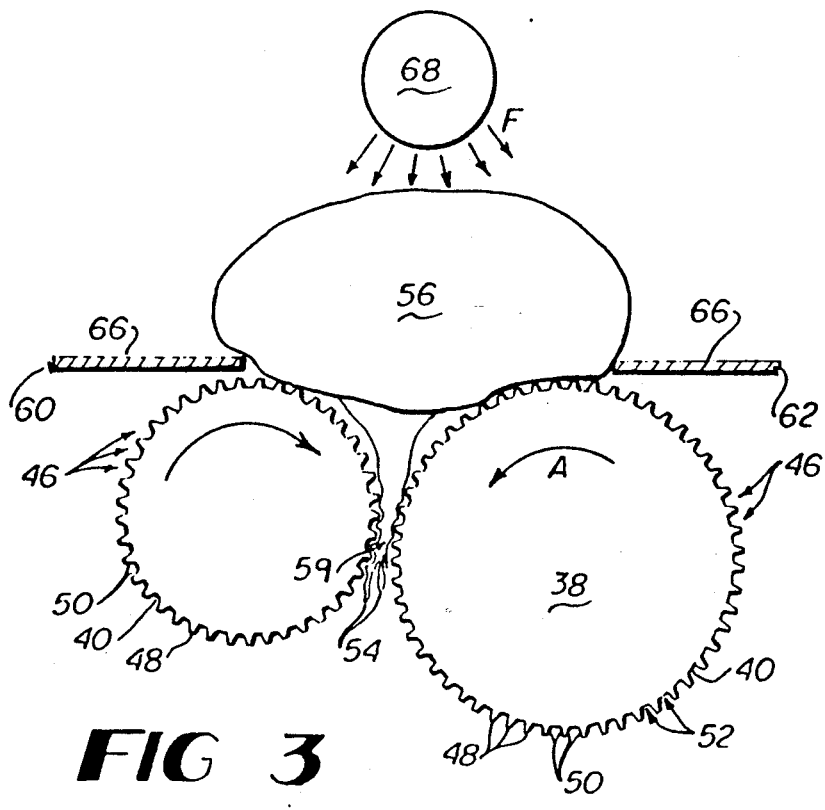
FIG. 3 is a schematic end view of a pair of variable diameter peeler rolls, illustrating the positioning of a poultry part on the peeler rolls.
Figure 4:
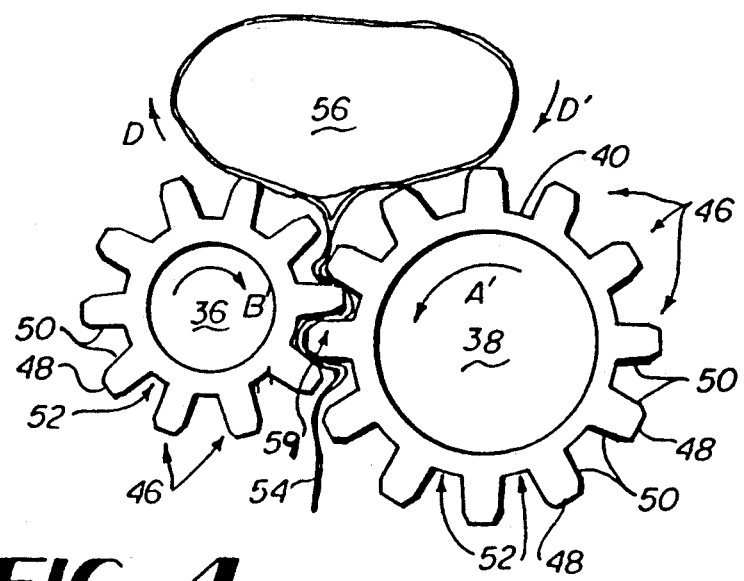
FIG. 4 is an end view of the poultry peeling apparatus illustrating the pair of variable diameter peeler rolls as having large teeth for skinning poultry necks.

As shown in FIG. 2, the peeler rolls 36 and 38 are arranged in substantially parallel juxtaposition spanning the open space 24 with the upper surfaces of the peeler rolls at approximately the same elevation, thereby forming poultry part surfaces. Each of the peeler rolls 36 and 38 includes an outer cylindrical surface 40, a proximate end 42 adjacent end frame member 20 at cross brace 26, and a distal end 44 adjacent end frame member 22 at cross brace 28. A plurality of helical teeth 46 are formed along the outer cylindrical surface at the peeler rolls, extending radially outwardly from the outer cylindrical surface of the peeler rolls and mesh together. As shown in FIG. 3 and 4, the teeth 46 of each peeler roll include tips 48 and a pair of flank portions 50. Open ended recesses 52 are formed between the flank portions 50 of adjacent teeth 44.

As shown in FIG. 3 these teeth 46 are rotated into engagement with skin 54 or other visceral matter of a poultry part 56 that is placed upon and supported by the peeler rolls 36 and 38 by the rotation of the peeler rolls about their axles 30 and 32 in the direction of Arrows A and B. The teeth 46 of each of the peeler rolls 36 and 38 each extend into the recess 52 of the other peeler roll 36 or 38, which is directly opposite each tooth 40 in a meshing relationship to pull the skin 54 from the poultry part 56.

Typically, for peeling the skin from poultry breasts or the lining from gizzards, the teeth 46 (FIG. 3) of the peeler rolls 36 and 38 are relatively small, projecting radially outwardly from the peeler rolls a distance of approximately 1/16 of an inch so that the meat of the breast or gizzard is not pinched and pulled away by the teeth.

As illustrated in FIG. 4, if the poultry part 56' being peeled is a poultry neck or back having a relatively thick and tough layer of skin 54' surrounding it, the teeth 40' of the peeler rolls 36' and 38' project radially outwardly from the outer cylindrical surface 40' of the peeler rolls a distance of approximately ¼ of an inch. Thus, the peeler rolls can take larger "bites" of the thicker neck skin to quickly and rapidly peel the skin 54' from the poultry part 56'.

As shown in FIG. 3, the peeler rolls 36 and 38 are of substantially different diameters, with small diameter peeler roll 36 having a diameter of approximately 1⅛ of an inch and large diameter peeler roller 38 having a diameter of approximately 2 inches. As a result, the work forces generated by the two peeler rolls are different, thereby causing the poultry part 56 (FIG. 3) being peeled to tend to tumble and spin as the poultry part 56 moves along the length of the peeler rolls to peel the skin 54 from the poultry part much more rapidly.

As FIG. 2 illustrates, the peeler rolls 36 and 38 are spaced apart from each other at their proximate ends 42 adjacent cross brace 26, creating a gap 58. This gap 58 provides an opening for facilitating the passage of the skin 54 of the poultry part 56 between and into engagement with teeth 46 of the peeler rolls. The peeler rolls extend diagonally toward cross brace 28, progressively narrowing this gap toward their distal ends 44. As the gap is narrowed, the teeth of the peeler rolls 36 and 38 are brought together, with the teeth of the peeler rolls meshing together to form a "nip" 59 and positively gripping the skin 54 of the poultry part 56. As shown in FIG. 2, the rotation of the peeler 36 and 38 causes the poultry parts to travel in the direction of Arrow C, from the proximate ends 42 of the peeler rolls toward the distal ends 44 of the peeler rolls as the teeth 46 of the peeler rolls engage and peel the skin from the poultry parts.

As shown in FIG. 1, pair of guide plates 60 and 62 are mounted to the end frame members 30 and 32 and are positioned adjacent the peeler rolls 36 and 38. The guide plates 60 and 62 are spaced apart from each other creating an open space or aperture 64 through which the poultry parts 56 (FIG. 3) are deposited onto the peeler rolls. The guide plates 60 and 62 are preferably constructed from stainless steel and have polished upper surfaces 66 that extend above and substantially parallel to the peeler rolls 36 and 38. The poultry parts 56 slide along the polished upper surfaces 66 as they are engaged and pulled along the length of the peeler rolls 36 and 38, with the guide plates 60 and 62 preventing the poultry parts from being pulled between the peeler rolls.

As illustrated in FIGS. 1 and 3, an air plenum 68 is positioned above and parallel to the gap 46 between the peeler rolls 36 and 38 adjacent the proximate ends 42 of the peeler rolls. The air plenum 68 directs forced streams of air, as shown by Arrows F, downwardly onto the poultry part 56 (FIG. 3). The force of these streams of air causes the poultry parts to tumble on the surfaces of the peeler rolls 36 and 38, thereby inducing the poultry parts to be pushed toward the peeler rolls as the peeler rolls rotate, enhancing the peeling function.

As shown in FIG. 2, a drive motor 70 is mounted to the support frame 12 behind cross brace 26. The drive motor 70 has a drive shaft 72 that extends outwardly from the drive motor and is rotated by the drive motor. A lower sheave 74, shown in phantom in FIG. 1, is affixed to the free end of the drive shaft 72 and thus is rotated by the rotation of the drive shaft. An upper sheave 76, mounted to the end of the axle 32 for peeler roll 38, is positioned above and parallel to the lower sheave 74. A drive belt 78, shown in phantom in FIG. 1, connects the two sheaves 74 and 76 together in a driving relationship such that as the lower sheaves 74 is rotated by the drive shaft 72, the upper sheave 76 rotates, causing peeler roll 38 to rotate in the direction of Arrows A (FIG. 3). The meshing of the teeth 46 of the peeler rolls 38 and 36 causes peeler roll 36 to rotate in the direction of Arrow B in response to the rotation of peeler roll 38 by the drive motor 62.

OPERATION

In the operation of the poultry peeling apparatus 10 (FIG. 2), a poultry part 56 such as a poultry breast, gizzard or neck is placed on the counter rotating peeler rolls 36 and 38. The poultry part 56 is tumbled and spun by the counter rotation of the peeler rolls, and as it does so, the skin 54 of the poultry part tends to find the gap 58 between the peeler rolls and became engaged between the meshing teeth 46 of the peeler rolls. Additionally, the force of the air flows, shown by Arrows F in FIG. 3, tends to urge the poultry part 56 onto the peeler rolls 36 and 38, increasing the likelihood of engagement of the skin 54 of the poultry part by the teeth of the peeler rolls.

This tumbling action of the poultry part 56 is enhanced by the use of different diameter peeler rolls 36 and 38. As FIG. 3 illustrates, the large diameter peeler roll 38 has a greater surface area in contact with the poultry part 56 than does the small diameter peeler roll 36. As a result, the pulling force exerted on the poultry part as the teeth 46 of the large diameter peeler roll engage the skin 54 of the poultry part and the large diameter peeler roll rotates in the direction of Arrow A is greater than the pulling force generated by the small diameter peeler roll 36. This inequality of the pulling forces exerted on the poultry part 56 by the two peeler rolls causes the poultry part to spin in the direction of Arrow D.

As the poultry part 56 spins, the skin 54 of the poultry part is turned into engagement with the teeth 46 of the small diameter peeler roll 36, which is rotating in a direction opposite from the direction of rotation of the poultry part, as shown by Arrow B. The skin 54 of the poultry part is urged against and held in positive engagement by the teeth 46 of the small diameter peeler roll 36, and the force exerted in the skin by the teeth of the small diameter peeler roll wiping the skin toward the nips 59 between the two peeler rolls and the poultry part urging the skin in the opposite direction against the teeth, as the poultry part spins. This positive engagement of the skin 54 causes a larger portion or "bite" of skin to be pulled away from the poultry part and into engagement at the nip 59 between the teeth of the two peeler rolls. The meshing of the teeth of the large and small diameter peeler rolls 38 and 36 at the nip 59 engages and pulls the skin downwardly and away from the poultry part.

Once the skin is engaged by the nip 59 between the two peeler rolls, the poultry part momentarily ceases to tumble as the skin is pulled from the portion of the poultry part that is engaging the peeler rolls. As the skin is pulled from that portion of the poultry part and the more dense muscle of the poultry part becomes exposed, the poultry part again begins to tumble as the more dense muscle of the poultry part is not as easily engaged by the teeth of the peeler rolls as is the skin, etc. The poultry part 56 again tumbles until the skin 54 protruding from another portion of the poultry part is spun into engagement with and is grasped by the teeth of the large and small diameter peeler rolls 36 and 38. In this manner, the poultry part is effectively and reliably cleared of the skin and other matter protruding from the poultry part.

By increasing the amount of skin being engaged by the teeth of the meshing large and small diameter peeler rolls 38 and 36 at the nip 59, the skin is effectively peeled from the poultry part at an increased rate not possible with conventional peeling machines with two equal diameter peeler rolls. When a poultry part 56 is placed on the equal diameter peeler rolls of conventional peeling machines, the counter rotation of the peeler rolls provides substantially equal work forces which cause the poultry part to bounce on the peeler rolls instead of spinning and tumbling in one direction against the rotation of one of the peeler rolls. As a consequence, instead of the skin being positively engaged and pulled by the teeth of the peeler rolls and wiped from the poultry part toward the nip between the peeler rolls, the skin has a tendency to pull free from the teeth of the peeler rolls except where it is pinched between the teeth of both peeler rolls as the teeth of the peeler rolls mesh together. Thus, the different diameter peeler rolls of the poultry peeling apparatus (FIGS. 1 and 2) effectively peel the skin from a poultry part at an increased rate not possible with conventional peeling machines having two peeler rolls of substantially equal diameter.

As shown in FIG. 2, the poultry part 56 is moved longitudinally in the direction of Arrow C by the meshing of the helical teeth 46 of the peeler rolls 36 and 38, tumbling and spinning as it moves. As the poultry part moves along the length of the peeler rolls, the skin and visceral matter, such as the pocket lining of gizzards is progressively peeled away from the poultry part and drops out from below the peeler rolls through the open space 24 formed in the rectangular platform 23 into a removal bin (not shown). The poultry part is then removed from the poultry peeling apparatus 10 for transport to additional processing stations.

DESCRIPTION OF THE ADDITIONAL EMBODIMENT

In an additional embodiment of the poultry peeling apparatus 110 (FIGS. 5 and 6) for use in peeling skin, and visceral matter 112 from a poultry part 114 such as a poultry breast and gizzard and for removing the crops, windpipes and other string-like body parts from a poultry carcass, the poultry peeling apparatus 110 (FIG. 5) includes a series of three elongated counter rotating peeler rolls 116, 118 and 120.

Figure 6:
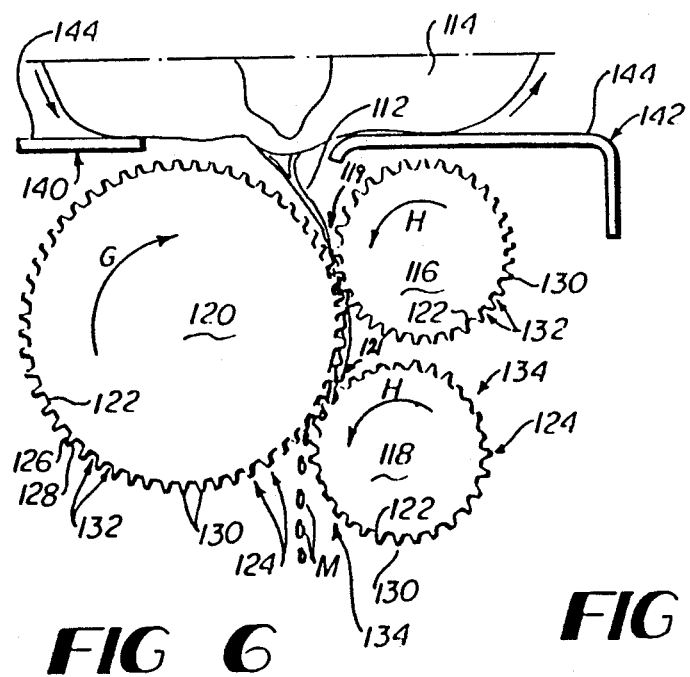
FIG. 6 is an end schematic view of the three peeler rolls, showing the peeler rolls engaging and pulling the skin from the poultry part.

As FIG. 6 illustrates, two of the peeler rolls 16 and 118 are smaller in diameter than is the third peeler roll 120. Small diameter peeler rolls 116 and 118 have a diameter of approximately 1⅛ inches and are positioned with upper small diameter peeler roll 116 mounted above and parallel to lower small diameter peeler roll 118, with the upper and lower small diameter peeler rolls spaced apart from each other. Large diameter peeler roll 120 has a diameter of approximately 2 inches and is mounted in a parallel juxtaposed relationship with the both upper small diameter peeler roll 116 and the lower small diameter peeler roll 118.

Figure 5:
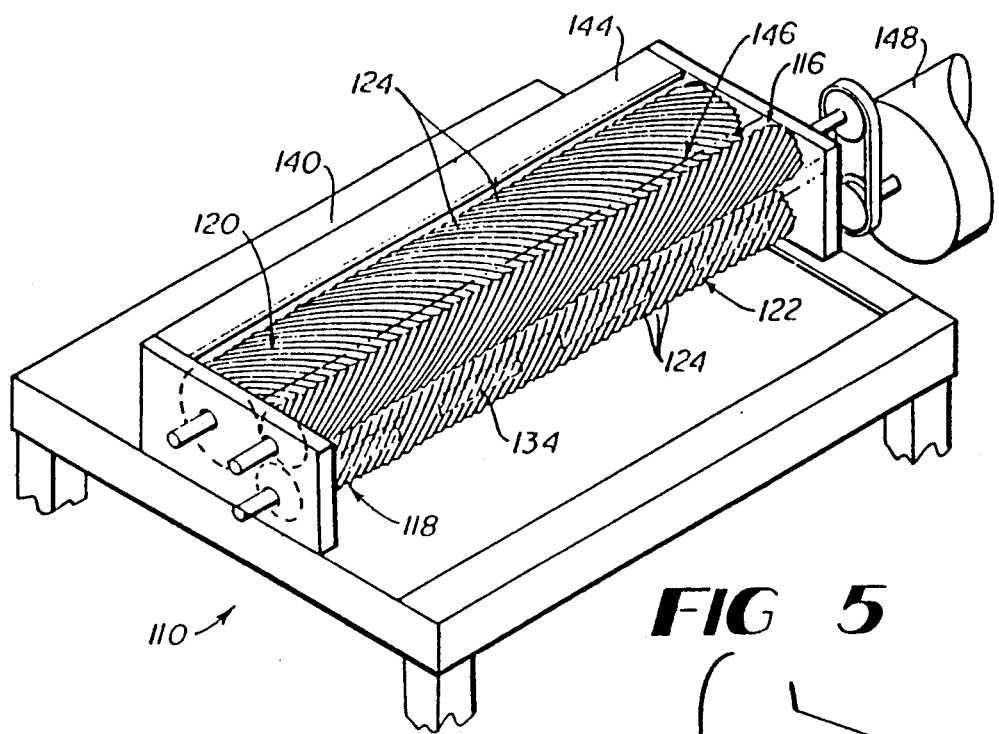
FIG. 5 is a perspective view of the poultry peeling apparatus, with parts broken away, illustrating the arrangement of three peeler rolls of the poultry peeling apparatus.
Figure 7:
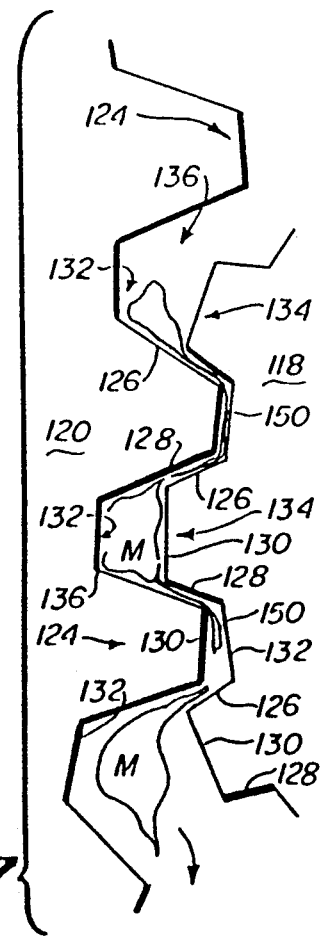
FIG. 7 is a schematic illustration of the accumulation of the skin of the poultry part within the cavities formed between the flats of the lower small diameter peeler roll and large diameter peeler roll.

As shown in FIGS. 5 and 6, each of the peeler rolls 116, 118 and 120 has an outer cylindrical surface 122 and a plurality of helical teeth 124 formed along the length of the outer cylindrical surface 122, extending outwardly from the outer cylindrical surface of the peeler rolls. As FIGS. 6 and 7 illustrate, the teeth 124 of the peeler rolls each have a substantially trapezoidal construction and include a pair of outwardly extending flanks 126 and 128 that taper inwardly and a substantially flat tip 130 formed between the ends of the flanks 126 and 128 of adjacent teeth 124. As the peeler rolls 116, 118 and 120 are rotated in the discharge of Arrows G and H, the teeth 124 of the large diameter roll 120 mesh with the teeth of the upper small diameter peeler roll 116, forming a nip 119 and with the teeth of the lower small diameter peeler roll 118 forming a nip 121.

The teeth of each of the peeler rolls project into the recesses 132 formed between the teeth of the opposite peeler roll as the peeler rolls are rotated in counter directions. The clearance or distance between the tips of the teeth that are projecting into the recesses and the outer cylindrical surface of the opposing peeler roll is generally relatively small, approximately 1000th of an inch.

As shown in FIG. 5, flats 134 are formed along the length of the lower small diameter peeler roll 118 at spaced intervals by the teeth 124 of the lower small diameter peeler roll 118 being worn down to approximately one half of their original height. As FIG. 7 illustrates, these flats 134 create cavities 136 when they mesh with the teeth 124 of the large diameter peeler roll 120. The clearance between the tips 130 of the teeth 124 of the lower small diameter peeler roll 118 projecting into the recesses 132 between the teeth of the large diameter peeler roll and the outer cylindrical surface 122 of the large diameter peeler roll 120 is increased to approximately 5000th's of an inch by these cavities 136. As a result, the skin 112 of the poultry part 114 tends to accumulate in masses within these cavities 136.

As illustrated in FIG. 5, a pair of parallel guide plates 140 and 142 are positioned above and adjacent the large diameter peeler roll 120 and the upper small diameter peeler roll 116 with guide plate 142, illustrated in phantom, partially covering the upper small diameter peeler roll. The guide plates 140 and 142 are preferably constructed from stainless steel and have polished upper guide surfaces 144 along which the poultry part 114 slides as it travels the length of the peeler rolls. The guide plates are spaced apart from each other, forming an open space or aperture 146, and function as a means for supporting the poultry part as it travels along the length of the peeler rolls, preventing the poultry part from being pulled down into the teeth of the peeler rolls.

A drive motor 148 is positioned behind the peeler rolls, linked in a driving relationship to the large peeler roll 120. The drive motor 148 causes large diameter peeler roll 120 to rotate in the direction of Arrow G (FIG. 6), and the meshing of the teeth 122 of the large diameter peeler roll 120 with the teeth 122 of the upper and lower small diameter peeler rolls 116 and 118 causes the counter rotation of the upper and lower small diameter peeler rolls in the direction of Arrows H.

OPERATION

In the operation of the second embodiment of the poultry peeling apparatus, a poultry part 114 (FIG. 6), such as a breast, neck or gizzard is placed upon the surfaces of the large diameter peeler roll 120 and the upper small diameter peeler roll 116. As the drive motor 148 (FIG. 5) engages and rotates the large diameter peeler roller, the meshing of its teeth 124 with the teeth 124 of the upper small diameter peeler roller 116 causes the upper small diameter peeler roller to rotate in the opposite direction, the poultry part 114 (FIG. 6) is tumbled and spun in the direction of Arrows I. As the poultry part 114 tumbles, its skin 112 is engaged and wiped into the nip 119 between the teeth 124 of the large diameter peeler roll 120 and the upper small diameter peeler roll 116.

As the teeth 124 of the large diameter peeler roll 120 and the upper small diameter peeler roll 116 mesh together, the skin 112 of the poultry part 114 is pulled into nip 119 between the upper small diameter peeler roll 116 and the large diameter peeler roll 120 and pulled downwardly between the two peeler rolls. The skin is then pulled into the nip 121 between the teeth 124 of the large diameter peeler roll 120 and the teeth of the lower small diameter peeler roll 118 and is engaged between the teeth of the large diameter peeler roll and the teeth 124 of the lower small diameter peeler roll 118, creating a double pulling action to pull the skin from the poultry part. As shown in FIG. 6, the teeth 124 of the large diameter peeler roll 120 project into the recesses 132 between the teeth of the upper small diameter peeler roll 116, compressing the skin 112 of the poultry part 114 into thin strips 150 of skin. These thin strips 150 of skin are created due to the skin being compressed and having nowhere to go as the projection of the teeth of the upper small diameter peeler roll into the recesses of the large diameter peeler roll also compresses skin.

However, as shown in FIG. 7, when the teeth of the large diameter peeler roll mesh with the flats 134 of the lower small diameter peeler roll, the compression of the skin 112 of the poultry part 114 by the projection of the teeth of the large diameter peeler roll into the recesses 132 between the teeth of the lower small diameter peeler roll, with the tips 130 of the teeth engaging the outer cylindrical surface 122 of the lower small diameter peeler roll 118, causes the skin to be extruded about the flanks 126 and 128 of the teeth of the large diameter peeler roll. The skin is squeezed around the teeth of the large diameter peeler roll 120 into the cavities 136 between the upper surfaces of the flats 134 and the outer cylindrical surface 132 of the large diameter peeler roll within the recesses between the teeth of the large diameter peeler roll. As a consequence, the skin 112 tends to collect in masses M within the cavities 136.

The stress created on the thin strips 150 of skin by the compression of the skin between the teeth of the large diameter peeler roll and the outer cylindrical surface 122 of the lower small diameter peeler roll weakens the thin strips of skin to the point of breaking. As the tips 130 of the teeth 124 of the large diameter peeler roll 120 engage the flanks 126 of the flats 130, the thin strips of skin are severed, thereby separating the masses M of skin 112 into segments. The centrifugal force resulting from the rotation of the peeler rolls acts on the accumulated masses M of skin 112 within the cavities 136, causing the masses M of skin to be expelled from between the teeth of the large diameter peeler roll. Thus, any accumulated skin is urged from between the teeth of the large diameter peeler roll such that the teeth of the large diameter peeler roll is thus effectively cleaned.

Additionally, the second embodiment of the poultry peeling apparatus is effective for removing the crops, windpipes and other elongated string-like body parts from poultry carcasses. The poultry carcass is placed upon the rotating peeler rolls and is tumbled by the rotation of the peeler rolls. The string-like body parts are engaged between the meshing teeth 124 of the large diameter peeler roll 120 and the upper small diameter peeler roll 116, and between the teeth 122 of the large diameter peeler roll 120 and the lower small diameter peeler roll 118. This dual engagement of the string-like body parts at more than one location along their length creates a double pulling action. This double pulling action resists the tendency of the string-like body parts to slip from between the teeth of the peeler rollers or to simply be pulled a certain distance and then worn through by the sliding frictional contact of the teeth of the peeler rolls with the string-like body parts. The double pulling action generates a sufficient force to pull the string-like body parts free from the poultry carcass without the string-like body parts being broken off and leaving portions of the string-like body parts with the poultry carcass.

It will be understood that the foregoing relates only to preferred embodiments of the present invention, and numerous changes and modifications can be made thereto without departing from the spirit and scope of the invention as set forth in the following claims.

I claim:

1. Apparatus for processing poultry parts such as gizzards and the like, comprising:
   a support frame;
   a pair of guide surfaces mounted to said support frame and spaced apart from one another to form an elongated aperture extending between said guide surfaces for receiving the poultry parts;
   at least two elongated rotatable peeler rolls each having a series of externally protruding teeth and intervening recesses, with the teeth of each peeler roll rotatable toward meshed relationship with the recesses of another one of said peeler rolls, said peeler rolls positioned parallel to one another and extending parallel to and adjacent said aperture formed between said guide surfaces for engaging and peeling poultry parts supported on said guide surfaces, with at least one of said peeler rolls having a substantially larger diameter than said other peeler rolls so that the larger diameter peeler roll rotates slower than said other peeler rolls; and
   a drive motor mounted on said support frame and engaging at least one of said peeler rolls in a driven relationship to thereby cause said peeler rolls to rotate.

2. The apparatus of claim 1 and wherein said peeler rolls comprise a pair of juxtaposed elongated rolls each having a plurality of helical teeth, with the teeth of one of said rolls extending opposite the teeth of the other of said rolls and with the teeth of said rolls meshing together.

3. The apparatus of claim 1 and wherein said peeler rolls comprise an elongated large diameter peeler roll having a plurality of helical teeth and juxtaposed with a pair of elongated small diameter peeler rolls, one positioned above and parallel to said other small diameter roll, with each of said small diameter peeler rolls having a plurality of helical teeth, and with the teeth of said large diameter peeler roll extending opposite to and meshing together with the teeth of said small diameter peeler rolls.

4. The apparatus of claim 3 and wherein at least one of said small diameter peeler rolls includes a plurality of flats formed in the teeth of said small diameter peeler roll and arranged at spaced apart intervals along the length of said small diameter peeler roll, said flats meshing with the teeth of said large diameter peeler roll to form a cavity between the teeth of said small diameter peeler roll and a recessed portion formed between the teeth of said large diameter peeler roll in which the skin of the poultry parts is collected and cut into segments as the skin is peeled from the poultry parts by said peeler rolls.

5. The apparatus of claim 1 and further including a means for inducing a flow of air downwardly with respect to said peeler rolls to induce the tissue and skin of the poultry parts to be grasped by the teeth of said peeler rolls.

6. Apparatus for pulling crops, windpipes and other string-like body parts from poultry parts, comprising:
   a support frame;
   a plurality of variable diameter peeler rolls mounted within said support frame and extending along a downwardly sloping path from an upper end portion to a lower end portion for engaging and pulling the crops and windpipes from the poultry parts, as the poultry parts are moved along the length of said peeler rolls;
   said peeler rolls including an elongated large diameter peeler roll juxtaposed with at least one elongated small diameter peeler roll having a smaller diameter than said large diameter peeler roll, with said large diameter peeler roll and said small diameter peeler roll each having a plurality of helical teeth, with the teeth of said small diameter peeler roll extending opposite to and meshing together with the teeth of said large diameter peeler roll to grasp and pull the crops and windpipes from the poultry parts; and
   a drive motor mounted to said support frame adjacent said upper end portion of said peeler rolls and attached to one of said peeler rolls in order to rotate said peeler roll, thereby causing each of said peeler rolls to rotate as said peeler rolls mesh together.

7. The apparatus of claim 6 and wherein at least one of said peeler rolls has a portion of its teeth missing to form flats which mesh with recesses formed between the teeth of one of said other peeler rolls to thereby create cavities between said flats of one of said peeler rolls and said recesses of one of said other peeler rolls.

8. Apparatus for pulling the crops, windpipes and other string-like body parts from poultry parts, comprising:
   a support frame;
   a plurality of variable diameter peeler rolls each having a plurality of teeth and each mounted within said support frame and extending along a downwardly sloping path for pulling the crops and windpipes from the poultry parts as the poultry parts move along the length of said peeler rolls;
   said peeler rolls including an elongated large diameter peeler roll juxtaposed with a pair of elongated small diameter peeler rolls each having a substantially smaller diameter than said large diameter peeler roll and positioned above and parallel to one another, with the teeth of said diameter small diameter peeler rolls engaging the teeth of said large diameter peeler roll; and
   a means for driving said peeler rolls, mounted to said support frame and connected to one of said peeler rolls for rotating one of said peeler rolls which meshes with said other peeler rolls to thereby cause each of said peeler rolls to rotate.

9. The apparatus of claim 6 and wherein said peeler rolls comprise a pair of elongated rolls juxtaposed with one another.

10. A method of skinning and removing the skin and elongated string-like visceral matter, such as crops and windpipes, from poultry carcasses comprising:
    placing the poultry carcasses on a plurality of elongated toothed peeler rolls;
    rotating the peeler rolls in opposite directions so that the teeth of the peeler rolls mesh together;
    engaging a portion of the skin, crops and windpipes of the poultry carcasses between a first peeler roll and a second peeler roll;

engaging the portion of the skin, crops and windpipes of the poultry carcasses between the first peeler roll and a third peeler roll; and pulling the skin, crops and windpipes between the first and second peeler rolls and between the first and third peeler rolls and away from the poultry carcasses.

11. The method of claim 10 and further including the steps of introducing a stream of air downwardly onto the poultry carcasses and urging the poultry carcasses between the peeler rolls to induce the peeler rolls to engage and pull the skin, crops and windpipes from the poultry carcasses.

12. The method of claim 10 and further including the steps of engaging the teeth of one of the peeler rolls of the second pair of peeler rolls with flats formed in the teeth of the other peeler roll of the second pair of peeler rolls, extruding the skin of the poultry carcasses engaged by the teeth of the second pair of peeler rolls into cavities formed between the flats of one peeler roll and the recesses between the teeth of the other peeler roll, severing the skin into segments, and urging the segments of skin out from between the teeth of the peeler rolls to thereby clean the peeler rolls.

13. Apparatus for removing skin and the like from poultry parts comprising:

at least three elongated peeler rolls arranged in approximately horizontal parallel relationship, with said peeler rolls each including outwardly protruding helical teeth, said peeler rolls including a first large diameter peeler roll, a second small diameter peeler roll of a diameter smaller than said first peeler roll, said first and second peeler rolls having their teeth in engagement with each other forming a nip between said peeler rolls and having upper arcuate surfaces of opposite sides of said peeler rolls forming poultry part support surfaces at approximately the same elevation for supporting poultry parts over said nip, and a third peeler roll positioned below said second peeler roll and having its teeth in engagement with the teeth of said first peeler roll forming a nip between said first and third peeler rolls, whereby the skin and the like of a poultry part resting on the poultry part support surfaces is grasped by the nip of the first and second peeler rolls downwardly away from the poultry part into the nip of the first and third peeler rolls and is pulled by the first and third peeler rolls further downwardly away from the poultry part.

14. The apparatus of claim 13 and wherein the third peeler roll includes at intervals a out its toothed surface foreshortened teeth which form recesses in its teeth for accommodating more poultry skin and the like at said nip between said first and third peeler rolls.

15. A method of peeling skin and the like from poultry parts with helically threaded peeler rolls, comprising:

gathering the skin of a poultry part toward the nip between adjacent parallel first and second rotatingly engaged peeler rolls, pulling the skin from the poultry part with the first and second peeler rolls at the nip of the first and second peeler rolls toward the nip of the first peeler roll and a third peeler roll rotatingly engaged with the first peeler roll, and pulling the skin from the nip of the first and second peeler rolls with the first and third peeler rolls at the nip of the first and third peeler rolls.

* * * * *